United States Patent
Lin et al.

(10) Patent No.: US 7,774,087 B2
(45) Date of Patent: Aug. 10, 2010

(54) WIRE ELECTRICAL DISCHARGE MACHINE WITH DEFORMATION COMPENSATION ABILITY

(75) Inventors: Yang-Xin Lin, Taipei (TW); Jui-Kuan Lin, Taichung (TW); Hsiang-Kuo Lee, Taoyuan County (TW)

(73) Assignee: Industrial Technology Research Institute, Hsin-Chu (TW)

( * ) Notice: Subject to any disclaimer, the term of this patent is extended or adjusted under 35 U.S.C. 154(b) by 319 days.

(21) Appl. No.: 12/033,671

(22) Filed: Feb. 19, 2008

(65) Prior Publication Data

US 2009/0143891 A1 Jun. 4, 2009

(30) Foreign Application Priority Data

Dec. 4, 2007 (TW) .............................. 96146021 A

(51) Int. Cl.
*G06F 19/00* (2006.01)
(52) U.S. Cl. ....................................... 700/162; 700/279
(58) Field of Classification Search ................ 700/110, 700/159, 162, 279; 219/69.1
See application file for complete search history.

(56) References Cited

U.S. PATENT DOCUMENTS

| | | | | |
|---|---|---|---|---|
| 5,491,647 A | * | 2/1996 | O'Brien et al. | ................ 701/99 |
| 6,614,234 B1 | * | 9/2003 | Imai et al. | .................... 324/452 |
| 2004/0238498 A1 | * | 12/2004 | Okuda et al. | ............. 219/69.12 |
| 2007/0279180 A1 | | 12/2007 | Sugimoto et al. | |

FOREIGN PATENT DOCUMENTS

WO 2007114088 10/2007

* cited by examiner

*Primary Examiner*—Kidest Bahta
*Assistant Examiner*—Nathan Laughlin
(74) *Attorney, Agent, or Firm*—WPAT, PC; Justin King

(57) ABSTRACT

A wire electrical discharge machine (WEDM) is disclosed, which comprises: a movable crane; a measure unit, mounted on the crane for measuring the deformation of the same; and a control unit, electrically connected to the measure unit and used for controlling the crane to move; wherein a lookup table describing the relation between the crane's deformation and position error is stored in the control unit, basing on which the control unit is able to perform a feedback displacement control on the crane with respect to its deformation.

9 Claims, 8 Drawing Sheets

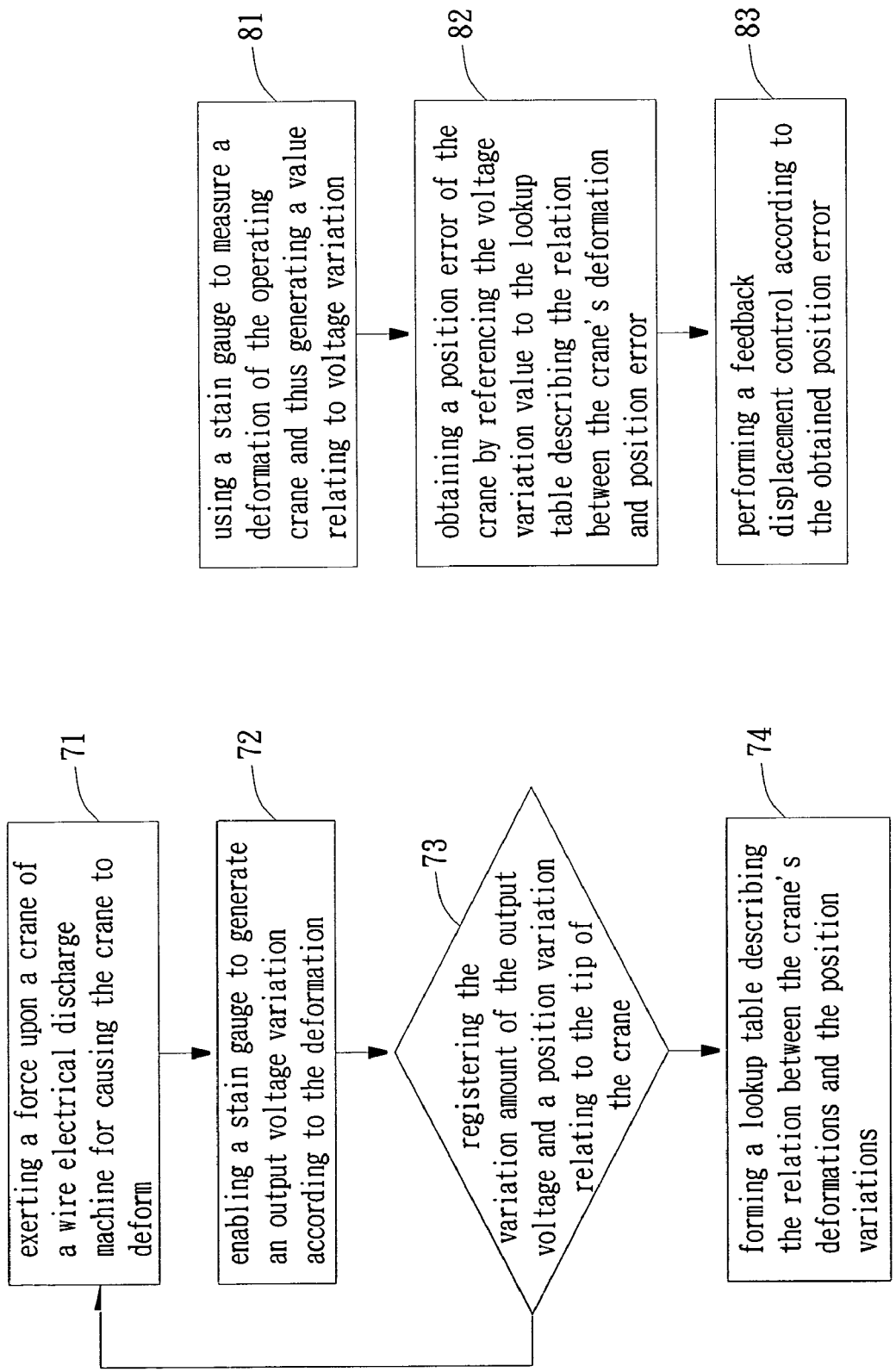

WIRE ELECTRICAL DISCHARGE MACHINE WITH DEFORMATION COMPENSATION ABILITY

FIELD OF THE INVENTION

The present invention relates to a wire electrical discharge machine with deformation compensation ability, and more particularly, to a wire electrical discharge machine capable of using a strain gauge mounted on its crane for cutting path error compensation.

BACKGROUND OF THE INVENTION

To implement a fully automated process for making high-precision products is becoming the focal point for any future machinery. It is because that in the foreseeable future, the crave for ultra precision dies or parts in industries, such as personal portable 3C products, optoelectronic communication and bio-medication, will be growing unstoppably. However, when it come to machine a ultra-precision product, the complexity as well as the design of the ultra-precision product is restricted by the precision of its machining process, that is, the capability of the machinery implementing the machining process. Therefore, until now, it is still a costly effort to integrate a variety of machining processes in an integration mechanism just for manufacturing a high-precision product.

Wire electrical discharge machining (WEDM) is one of the most accurate non-conventional manufacturing processes available for creating complex or simple shapes or geometries within parts and assemblies. WEDM works by eroding material in the path of electrical discharges that form an arc between a wire electrode and a work piece. WEDM manufacturing is a very desirable manufacturing process when it comes to cutting some of the hardest material used in the industries in high accuracy.

With the growing demand for ultra-precision dies and parts, the market for WEDM machines is expanding as well. However, when the WEDM machines are mass produced, it is difficult to ensure each mass-produced WEDM machine to perform a manufacturing process at the same accuracy, that is, the mass production of WEDM machine will suffer a stability problem. Such stability problem is originated from the complex production process including a plurality of procedures, such as frame casting, parts manufacturing and assembling, and also, from the human error caused by the massive man power used in the complex production process. As WEDM is usually performed in a bath of a working fluid exerting directly on the upper and the lower wire guides at about 20 kg/cm2 for flushing materials away, the flushing of the working fluid at such high pressure is going to cause the lower wire guide to drop and thus the machining head of the lower wire guide to drift in space since the lower wire guide can be slim and is extending away from its support. It is known that a WEDM machine uses a wire electrode holding between an upper wire guide and a lower wire guide to performs an electrical discharge cutting, and before the cutting is performed, the controller of the WEDM machine will calculated a cutting path for the wire electrode assuming that the wire electrode is a virtue line connecting the machining heads of the upper and the lower wire guides while taking the radius of the wire electrode into consideration for path compensation. Thus, If the machining heads of the upper and lower wire guides are drifting by deformation during a machining process, the wire electrode will not be cutting in the path as expected and thus the machining accuracy is jeopardized.

In the conventional WEDM machines, the structures of those upper and lower wire guides have the following shortcomings:

(1) The wire guides can be deformed by torques originated from the flushing of a working fluid at a high pressure upon such wire guides: As show in FIG. 1, since WEDM is usually performed in a bath of a working fluid exerting directly on the upper and the lower wire guides 10, 12 at about 20 kg/cm2 for flushing materials away and such jet of working fluid is emitted from nozzles on the machining heads of the upper and the lower wire guides 10, 12, each of the machining heads of the upper and the lower wire guides 10, 12 are going to sustain a reaction force of the 20 kg/cm2 flushing working fluid that will cause a torque exerting on the corresponding wire guide and thus eventually cause the wire guide to deform. Especially for the lower wire guide 14, the deformation can be much more severe since its machining head is extending farther away from its support than that of the upper wire guide 10 and its cross section area is smaller.

(2) The deformation of a wire guide is affected by the material and the length of the wire guide as well as by the flushing pressure of working fluid exerting thereon: As the deformation is primarily caused by a torque exerting on a corresponding wire guide, which is equal to the product of the length of the wire guide and the force exerting on the machining head of the wire guide. Thus, different flushing pressures and different lengths will cause different torques, and therefore different deformations. In addition, as the rigidity of the wire guide is dependent primarily upon its material, it is noted that a wire guide made of a material with high rigidity can deform less when compare with those made of materials of less rigidity while subjecting to a same torque.

(3) It is unable to perform an on-line compensation since there is no way of knowing how much a wire guide is deformed: Since current WEDM machines do not provide any means for detecting wire guide deformations so that there is no way to compensation the error of such deformation.

Therefore, it is in need of a wire electrical discharge machine with deformation compensation ability that can compensate a cutting path error caused by the flushing pressure of working fluid.

SUMMARY OF THE INVENTION

The object of the present invention is to provide a wire electrical discharge machine with deformation compensation ability, capable of using a strain gauge mounted on its crane to measure a deformation relating to the crane and thus performing a feedback control accordingly for achieving a cutting path compensation.

To achieve the above object, the present invention provides a wire electrical discharge machine with deformation compensation ability, comprising: a movable crane; a measure unit, mounted on the crane for measuring the deformation of the same; and a control unit, electrically connected to the measure unit and used for controlling the crane to move; wherein a lookup table describing the relation between the crane's deformation and position error is stored in the control unit, basing on which the control unit is able to perform a feedback displacement control on the crane with respect to its deformation.

In an exemplary embodiment of the invention, a crane deformation compensating method for a wire electrical discharge machine is provided, which comprises the steps of:

(a) providing a wire electrical discharge machine configured with a movable crane; a measure unit, mounted on the crane for measuring the deformation of the same; and a control unit, electrically connected to the measure unit and used for controlling the crane to move;

(b) using the measure unit to measure a deformation of the operating crane and thus generating a deformation signal accordingly;

(c) enabling the control unit to receive the deformation signal and thereafter obtain a position error by referencing the deformation signal to a lookup table describing the relation between the crane's deformation and position error; and (d) enabling the control unit to perform a feedback displacement control according to the obtained position error.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings which are given by way of illustration only, and thus are not limitative of the present invention and wherein:

FIG. 7 is a flow chart showing the steps for forming a lookup table describing the relation between the crane's deformations and the position errors.

FIG. 8 is a flow chart showing the steps of crane deformation compensating method of the invention.

DESCRIPTION OF THE EXEMPLARY EMBODIMENTS

For your esteemed members of reviewing committee to further understand and recognize the fulfilled functions and structural characteristics of the invention, several exemplary embodiments cooperating with detailed description are presented as the follows.

Figure 1:
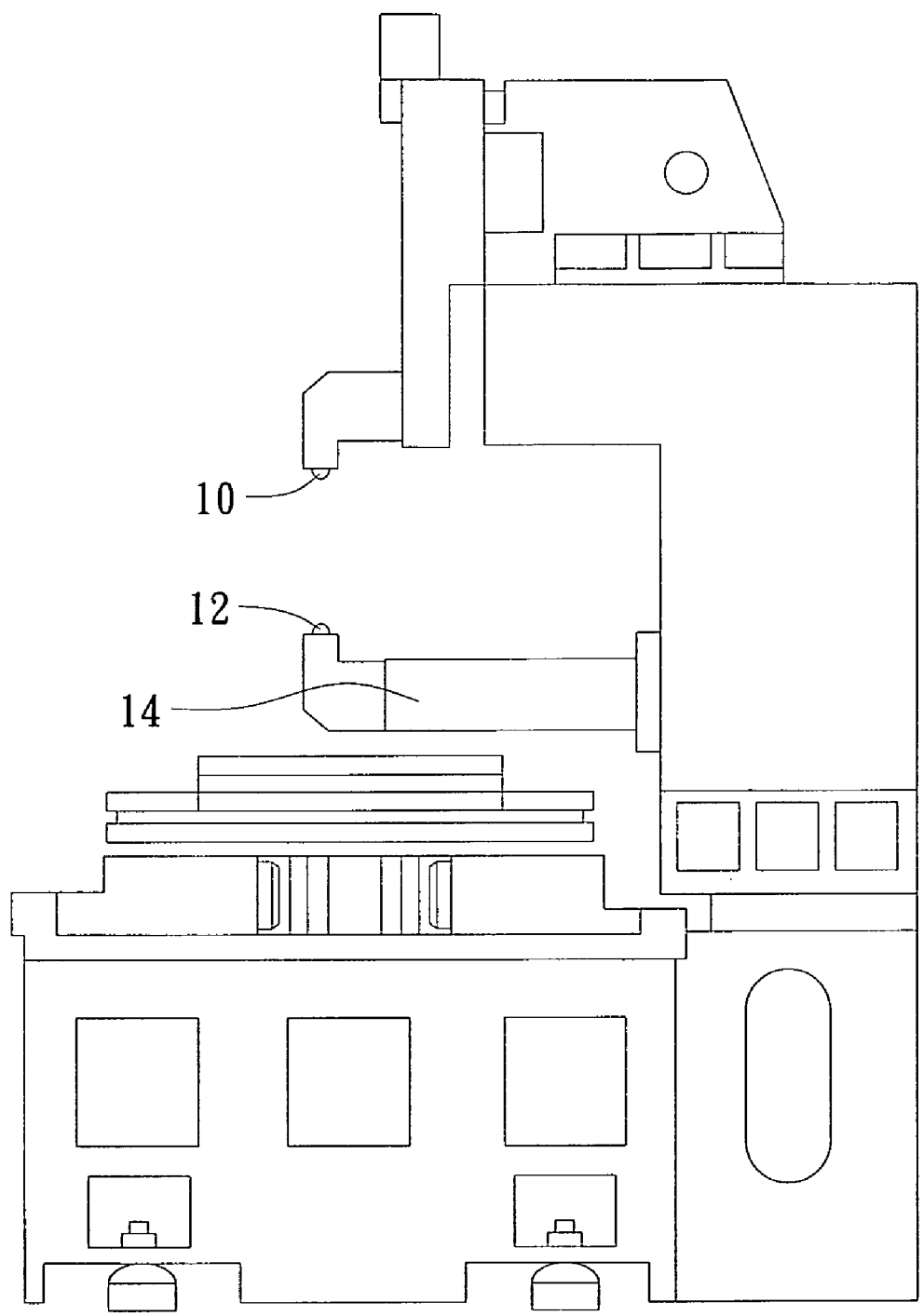
FIG. 1 is a schematic diagram showing a conventional wire electrical discharge machine.
Figure 2:
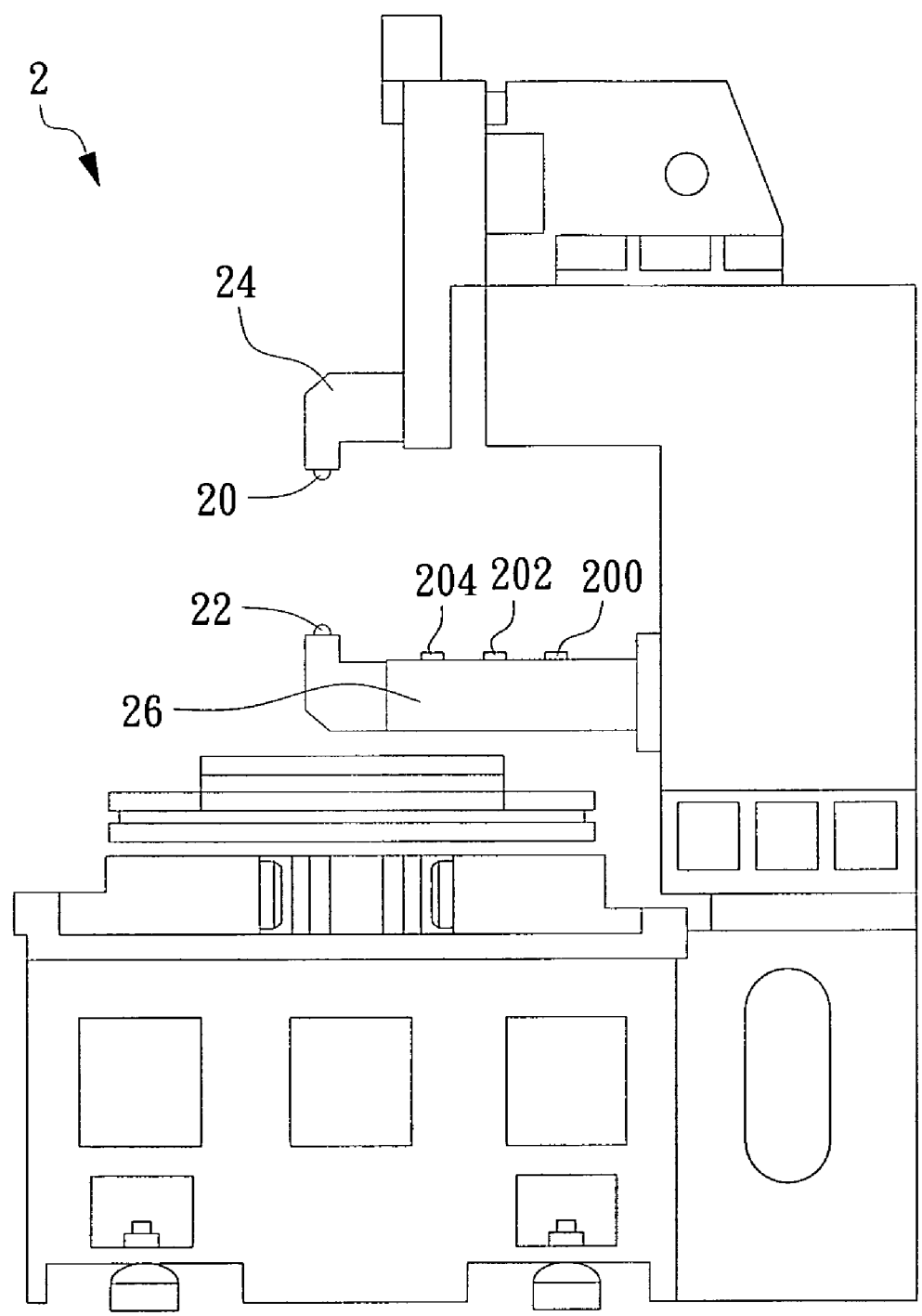
FIG. 2 is a schematic diagram showing a wire electrical discharge machine according to an exemplary embodiment of the invention.
Figure 3A:
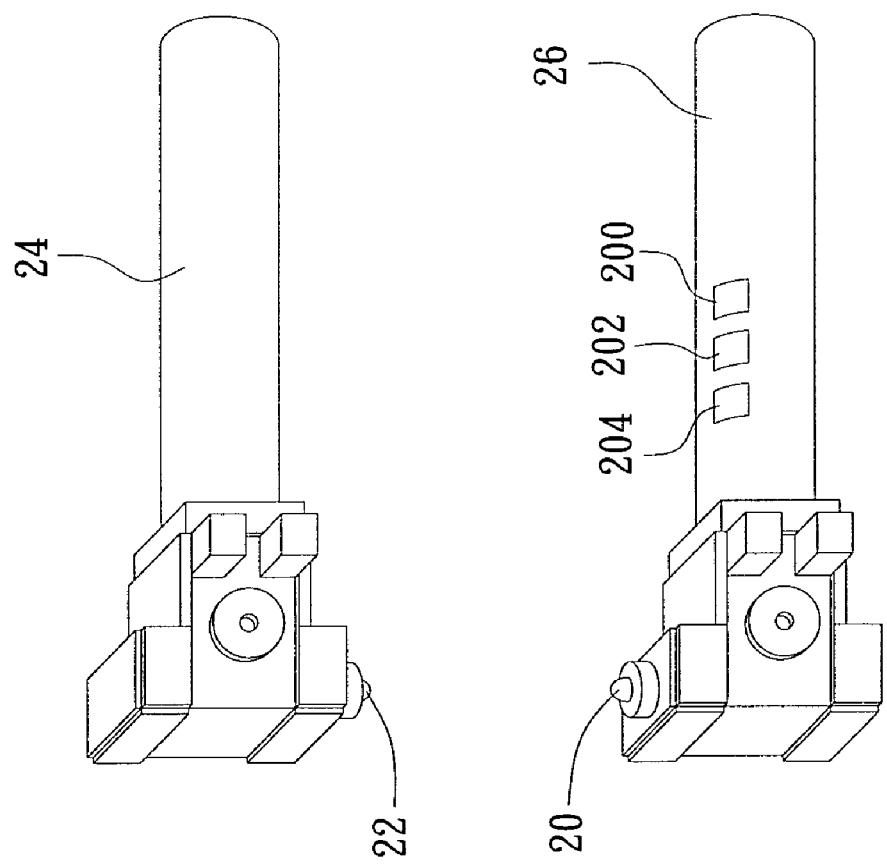
FIG. 3A is a schematic diagram showing a crane used in a wire electrical discharge machine of the invention that is not deformed.
Figure 3B:
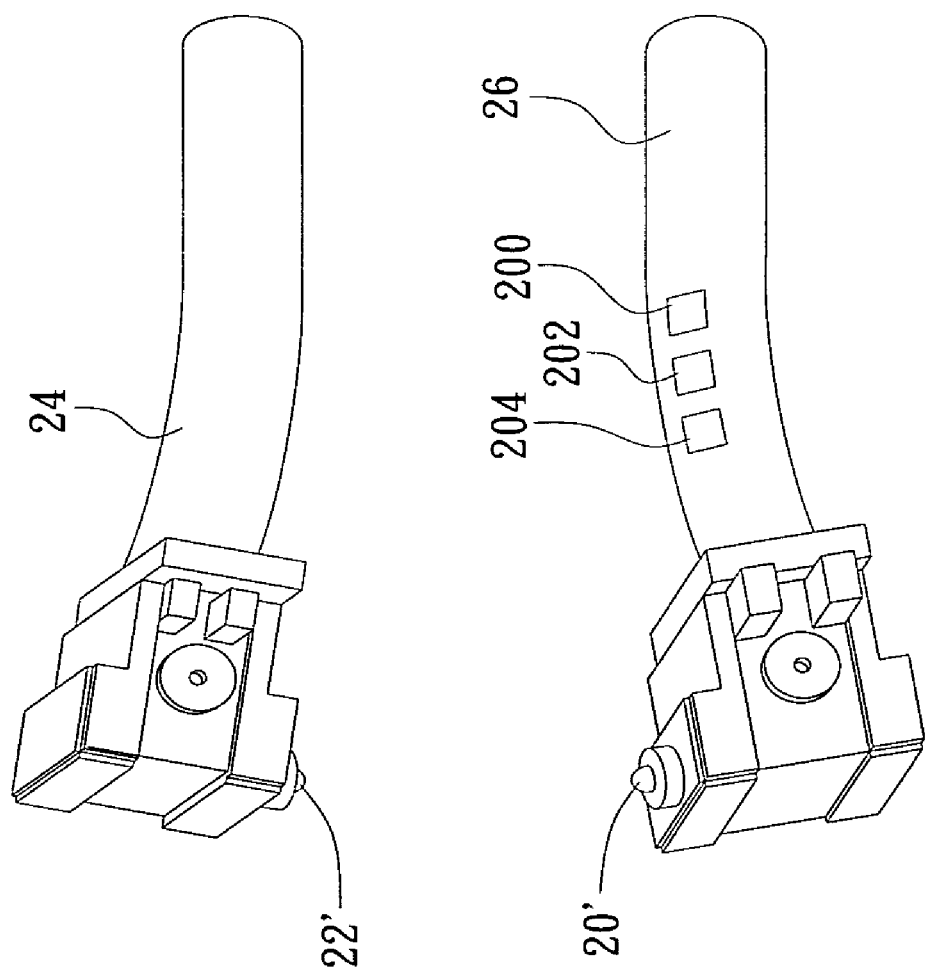
FIG. 3B is a schematic diagram showing a crane used in a wire electrical discharge machine of the invention that is deformed.

Please refer to FIG. 2, which is a schematic diagram showing a wire electrical discharge machine according to an exemplary embodiment of the invention. The wire electrical discharge machine (WEDM) with deformation compensation ability of FIG. 2 uses a movable crane to perform a cutting operation upon a workpiece, in which the movable crane is composed of an upper crane 24 and a lower crane 26, respectively having machining heads 20, 22 disposed thereon. It is known that the WEDM works by eroding material in the path of electrical discharges that form an arc between a wire electrode and a work piece, and the wire electrode is arranged passing through the machining head 20 of the upper crane 24 and the machining head 22 of the lower crane 26. As WEDM is usually performed in a bath of a working fluid exerting directly on the upper and the lower cranes 24, 26 at position surrounding the two machining heads 20, 22 for flushing materials away, the flushing of the working fluid is going to cause the upper and the lower cranes 24, 26 to deform, as shown in FIG. 3A and FIG. 3B. Moreover, the deforming of the two cranes 24, 26 will cause the two machining heads 20, 22 to drift and misalign relatively so that the wire electrode will not be cutting in the path as expected and thus the machining accuracy is decreased.

Figure 4:
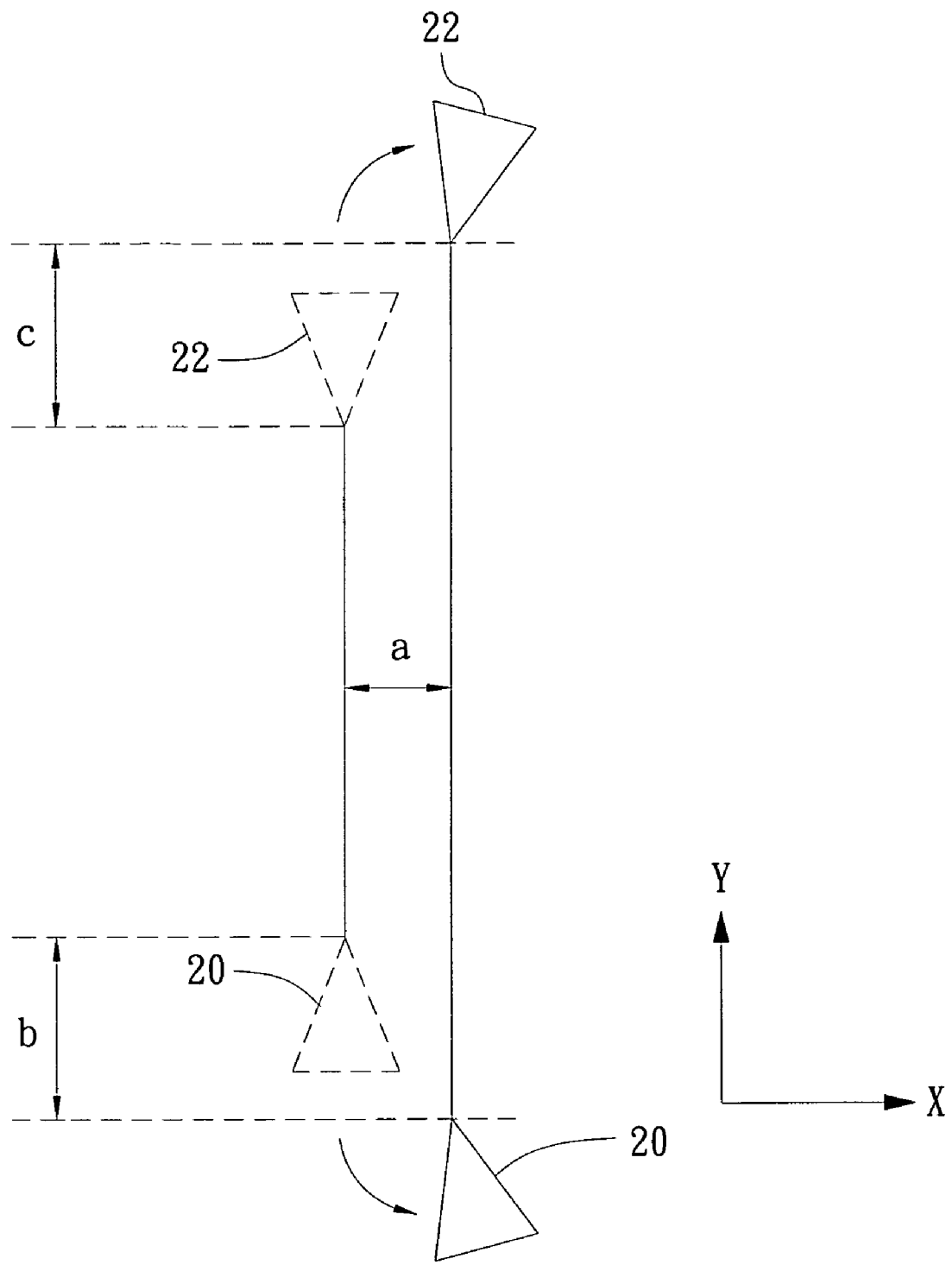
FIG. 4 is a schematic diagram showing the displacement of the machining head of a crane used in a wire electrical discharge machine of the invention.

Please refer to FIG. 4, which is a schematic diagram showing the displacement of the machining head of a crane used in a wire electrical discharge machine of the invention. As the two machining heads 20, 22 are misaligned by the deformations of the upper and the lower cranes 24, 26, it is possible to generate a displacement a in the X direction and the displacements b and c respectively in the Y direction.

Please refer to FIG. 2, which is a schematic diagram showing a wire electrical discharge machine according to an exemplary embodiment of the invention. In this exemplary embodiment, there are a plurality of strain gauges, i.e. three strain gauges 200, 202, 204 as shown in FIG. 2, being mounted on the lower crane 26 for a purpose of deformation detection. As shown in FIG. 2, the deformation of the lower crane 26 is going to bring along the three strain gauges 200, 202, 204 to deform therewith, and thereby, the resistance of the deformed strain gauges 200, 202, 204 will be affected by the extent of the deformation. In this embodiment, such resistance change is being converted into a voltage variation by the use of an impedance variation amplification circuit, as that shown in FIG. 6. It is noted that although the strain gauges 200, 202, 203 are disposed only on the lower crane 26 in this exemplary embodiment, the disposition of strain gauge is not limited thereby and thus there can be strain gauges being disposed on the upper crane 24 also. Therefore, the disposition of strain gauge is dependent upon actual requirement and is not limited by the aforesaid embodiment.

Figure 5A:
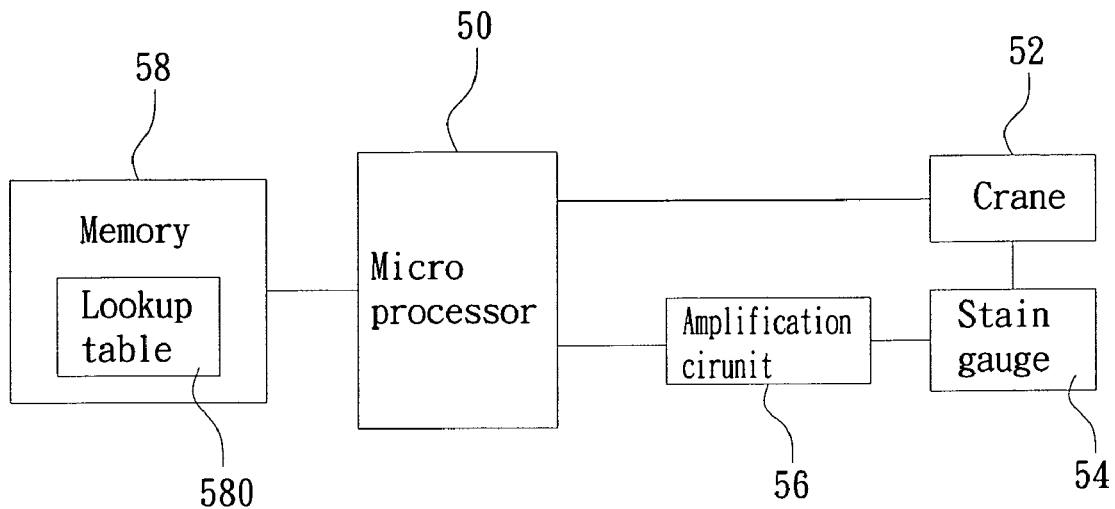
FIG. 5A is a block diagram depicting a wire electrical discharge machine according to an exemplary embodiment of the invention.

In another embodiment of the invention, there can be a micro processor being arranged in the WEDM of the invention. Please refer to FIG. 5A, which is a block diagram depicting a wire electrical discharge machine according to an exemplary embodiment of the invention. In FIG. 5A, the strain gauge 54 is electrically connected to an impedance variation amplification circuit 56 and then the impedance variation amplification circuit 56 is connected to a micro processor 50. Moreover, the micro processor 50 is further electrically connected to a memory 58, in which the memory 58 has a lookup table 580 stored therein whereas the lookup table 580 is used for describing the relation between the crane's deformation and position error. By the aforesaid components, a feedback displacement control can be performed upon the crane with respect to its deformation.

Figure 5B:
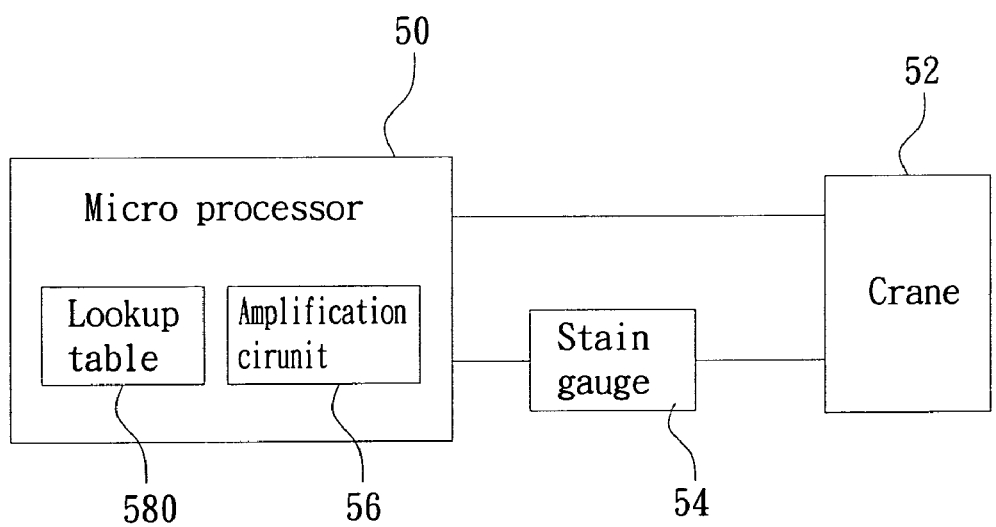
FIG. 5B is a block diagram depicting a wire electrical discharge machine according to another exemplary embodiment of the invention.

Although the WEDM of the invention can be thus described as that shown in FIG. 5A, it is obvious that the same may be varied in many ways. One such variation is shown in FIG. 5B. In FIG. 5B, the crane 52 is electrically connected to the microprocessor 50 and the strain gauge 54 respectively while the micro processor 50 is also electrically connected to the strain gauge 54. Moreover, the impedance variation amplification circuit 56 as well as the lookup table 580 are formed directly in the micro processor 50.

Figure 6:
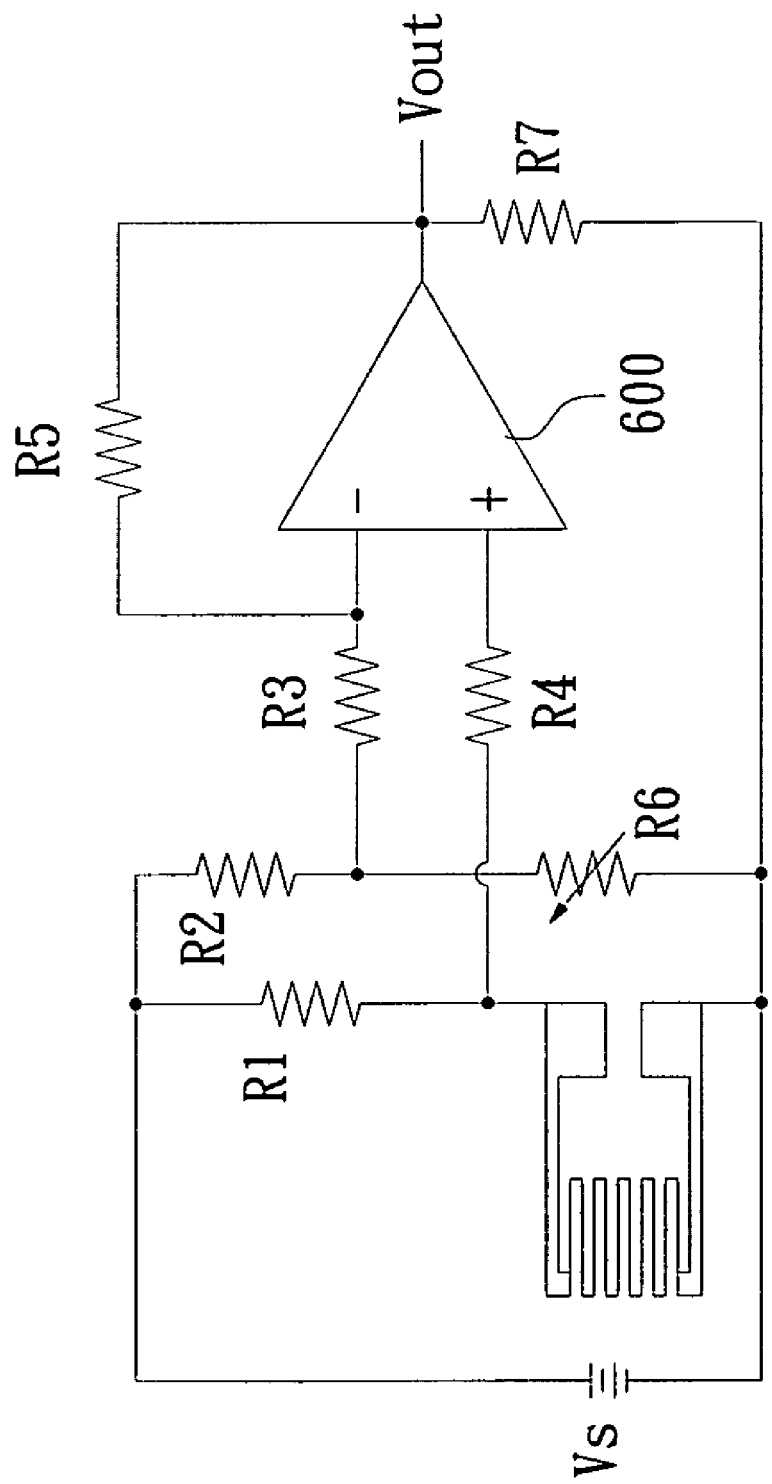
FIG. 6 is a circuit diagram of a precision impedance variation amplification circuit used in a wire electrical discharge machine of the invention.

Please refer to FIG. 6, which is a circuit diagram of a precision impedance variation amplification circuit used in a wire electrical discharge machine of the invention. The calculation performed in the impedance variation amplification circuit is performed in an operation zone 600 thereof, which is composed of a variety of components. It is capable of not only compensating the temperature drift and the voltage drift between components, but also noise suppressing and impedance matching, so that it is functioning equivalent to a precision operation amplifier.

It is noted that the deformation of the crane is going to bring along the strain gauge mounted thereon to deform therewith, and thereby, the resistance of the deformed strain gauge will be affected by the extent of the deformation. Moreover, such resistance change is being converted into an output voltage variation by the use of an impedance variation amplification circuit.

Please refer to FIG. 7, which is a flow chart showing the steps for forming a lookup table describing the relation between the crane's deformations and the position errors. The flow starts from step 71. At step 71, a force is exerted upon a crane of a wire electrical discharge machine for causing the crane to deform and thus enabling the machining head mounted on the crane to move and thus causing a position variation to be generated; and then the flow proceeds to step 72. At step 72, a strain gauge affected by the crane's deformation is enabled to generate an output voltage variation according to the deformation; and then the flow proceeds to step 73. At step 73, the variation amount of the output voltage and a position variation relating to the machining head of the crane are registered; and then the flow proceeds back to step 71 for obtaining another set of data relating to the deformation and when a specific amount of data are obtained, the flow proceeds to step 74. At step 74, a lookup table describing the relation between the crane's deformations and the position variations is formed by the plural sets of data obtaining from the repeating of step 71 to step 73.

Please refer to FIG. 8, which is a flow chart showing the steps of crane deformation compensating method of the invention. The flow starts from step 81. At step 81, a strain gauge is used for measuring a deformation of an operating crane and thus generating a value relating to voltage variation; and then the flow proceeds to step 82. At step 82, after the voltage variation value is received by the micro processor, a position error of the crane is obtained by referencing the voltage variation value to the lookup table describing the relation between the crane's deformation and position error; and then the flow proceeds to step 83. At step 83, the micro processor is enabled to perform a feedback displacement control upon the crane according to the obtained position error.

Thus, the wire electrical discharge machine with deformation compensation ability of the invention is able to perform a feedback displace control upon its deforming crane in a manner that the deformation of its crane, caused by the flushing pressure of its working fluid, can be compensated for aligning the corresponding displaced machining head back to its designed position and thus maintaining the wire electrode to cut in the path as expected so that the cutting accuracy is enhanced while ensuring the machining precision to be free from the affection of crane's deformation.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A crane deformation compensating method for a wire electrical discharge machine is provided, comprising the steps of:
   a providing a wire electrical discharge machine configured with a movable crane; a measure unit, mounted on the crane for measuring the deformation of the same; and a control unit, electrically connected to the measure unit and used for controlling the crane to move;
   b using the measure unit to measure a deformation of the operating crane and thus generating a deformation signal accordingly;
   c enabling the control unit to receive the deformation signal and thereafter obtain a position error of the crane by referencing the deformation signal to a lookup table describing the relation between the crane's deformation and position error, wherein the lookup table is formed by the steps of:
   (a1) exerting a plurality of force of different magnitudes upon the crane for causing the same to generate a plurality of deformation accordingly and thereafter registering a plurality of position errors of the crane in correspondence to the plural deformations;
   (a2) enabling the measure unit to generate a plurality of deformation signals in correspondence to the plural deformations; and
   (a3) enabling the control unit to form a lookup table describing the relation between the crane's deformations and the position errors; and
   d enabling the control unit to perform a feedback displacement control according to the obtained position error.

2. The crane deformation compensating method of claim 1, wherein the measure unit further comprises at least a strain gauge.

3. The crane deformation compensating method of claim 2, wherein the measure unit further comprises an impedance variation amplification circuit.

4. The crane deformation compensating method of claim 2, wherein the control unit further comprises an impedance variation amplification circuit.

5. The crane deformation compensating method of claim 3, wherein the at least one strain gauge is enabled to generate an impedance variation according to the deformation of the crane while feeding the impedance variation to the impedance variation amplification circuit where it is converted into an output voltage variation so as to be used by the control unit for obtaining the position error of the crane by referencing the output voltage variation to the lookup table.

6. The crane deformation compensating method of claim 3, wherein the at least one strain gauge is enabled to generate an impedance variation according to the deformation of the crane while feeding the impedance variation to the impedance variation amplification circuit where it is converted into an output voltage variation so as to be used by the control unit for obtaining the position error of the crane by referencing the output voltage variation to the lookup table.

7. The crane deformation compensating method of claim 4, wherein the at least one strain gauge is enabled to generate an impedance variation according to the deformation of the crane while feeding the impedance variation to the impedance variation amplification circuit where it is converted into an output voltage variation so as to be used by the control unit for obtaining the position error of the crane by referencing the output voltage variation to the lookup table.

8. The crane deformation compensating method of claim 1, wherein the measure unit further comprises an impedance variation amplification circuit.

9. The crane deformation compensating method of claim 1 wherein the control unit further comprises an impedance variation amplification circuit.

* * * * *